US010713466B2

(12) United States Patent
Chiang et al.

(10) Patent No.: US 10,713,466 B2
(45) Date of Patent: Jul. 14, 2020

(54) FINGERPRINT RECOGNITION METHOD AND ELECTRONIC DEVICE USING THE SAME

(71) Applicant: Egis Technology Inc., Taipei (TW)

(72) Inventors: Yuan-Lin Chiang, Taipei (TW); Jun-Chao Lu, Taipei (TW); Yu-Chun Cheng, Taipei (TW)

(73) Assignee: Egis Technology Inc., Taipei (TW)

( * ) Notice: Subject to any disclaimer, the term of this patent is extended or adjusted under 35 U.S.C. 154(b) by 341 days.

(21) Appl. No.: 15/860,675

(22) Filed: Jan. 3, 2018

(65) Prior Publication Data

US 2018/0129862 A1    May 10, 2018

Related U.S. Application Data

(63) Continuation-in-part of application No. 14/624,272, filed on Feb. 17, 2015, now Pat. No. 9,892,308.
(Continued)

(30) Foreign Application Priority Data

Mar. 7, 2014  (TW) .............................. 103107800 A
Jul. 31, 2014  (TW) .............................. 103126149 A

(51) Int. Cl.
*G06K 9/00*    (2006.01)
(52) U.S. Cl.
CPC ..... *G06K 9/00093* (2013.01); *G06K 9/00026* (2013.01); *G06K 9/00073* (2013.01); *G06K 9/00912* (2013.01); *G06K 9/00926* (2013.01)
(58) Field of Classification Search
CPC ..... H04L 2209/24; G06F 21/31; G06F 21/32; G06F 17/3028; G06K 9/00013;
(Continued)

(56) References Cited

U.S. PATENT DOCUMENTS 5,982,913 A   11/1999  Brumbley et al.
6,289,114 B1   9/2001  Mainguet
(Continued)

FOREIGN PATENT DOCUMENTS

CN    1450494    10/2003
CN    104281841    1/2015
(Continued)

OTHER PUBLICATIONS

Osterburg et al., "Development of a Mathematical Formula for the Calculation of Fingerprint Probabilities Based on Individual Characteristics", Journal of the American Statistical Association, Dec. 1977, pp. 772-778.
(Continued)

*Primary Examiner* — Kim Y Vu
*Assistant Examiner* — Michael J Vanchy, Jr.
(74) *Attorney, Agent, or Firm* — JCIPRNET

(57) ABSTRACT

A fingerprint recognition method adapted to an electronic device is provided. The electronic device includes a processing unit and a fingerprint sensor. The fingerprint recognition method includes steps of: obtaining a plurality of swiping frames; extracting a plurality of feature points respectively from the plurality of swiping frames to generate a plurality of pre-registered fingerprint datasets accordingly; merging the plurality of pre-registered fingerprint datasets; generating a registration template according to the merged pre-registered fingerprint datasets; obtaining a pressing frame; extracting a plurality of feature points from the pressing frame to generate a verifying fingerprint dataset; and comparing the verifying fingerprint dataset with the registration template, so as to determine whether the verifying fingerprint dataset matches the registration template. The above electronic device is also provided.

16 Claims, 12 Drawing Sheets

400

Related U.S. Application Data

(60) Provisional application No. 62/571,264, filed on Oct. 12, 2017.

(58) Field of Classification Search
CPC ............... G06K 9/00087; G06K 9/001; G06K 9/00026; G06K 9/0008; G06K 9/00093; G06K 9/6201; H04N 7/18
See application file for complete search history.

(56) References Cited

U.S. PATENT DOCUMENTS

| | | | |
|---|---|---|---|
| 6,459,804 B2 | 10/2002 | Mainguet | |
| 7,190,816 B2 | 3/2007 | Mitsuyu et al. | |
| 8,810,367 B2 | 8/2014 | Mullins | |
| 9,898,642 B2 | 2/2018 | Han et al. | |
| 2003/0126448 A1 | 7/2003 | Russo | |
| 2004/0131237 A1* | 7/2004 | Machida | G06K 9/00026 382/124 |
| 2004/0199775 A1* | 10/2004 | Ser | G06K 9/00067 713/186 |
| 2005/0169503 A1 | 8/2005 | Howell et al. | |
| 2005/0238211 A1 | 10/2005 | Du et al. | |
| 2008/0049987 A1 | 2/2008 | Champagne et al. | |
| 2009/0067679 A1* | 3/2009 | Mainguet | G06K 9/00026 382/115 |
| 2011/0223888 A1 | 9/2011 | Esaki | |
| 2012/0076370 A1 | 3/2012 | Lei et al. | |
| 2012/0268246 A1 | 10/2012 | Liu | |
| 2012/0308092 A1 | 12/2012 | Benkley et al. | |
| 2013/0076485 A1 | 3/2013 | Mullins | |
| 2013/0329967 A1* | 12/2013 | Abiko | G06K 9/00026 382/115 |
| 2014/0003677 A1 | 1/2014 | Han et al. | |
| 2014/0003678 A1 | 1/2014 | Vieta et al. | |
| 2014/0003679 A1 | 1/2014 | Han et al. | |
| 2014/0003681 A1 | 1/2014 | Wright et al. | |
| 2014/0199966 A1 | 7/2014 | Schushan | |
| 2014/0212010 A1 | 7/2014 | Han et al. | |
| 2014/0267659 A1 | 9/2014 | Lyon et al. | |
| 2015/0146945 A1 | 5/2015 | Han et al. | |
| 2016/0147825 A1 | 5/2016 | Chiang et al. | |
| 2017/0103254 A1 | 4/2017 | Pi et al. | |
| 2017/0124379 A1 | 5/2017 | Zhang et al. | |

FOREIGN PATENT DOCUMENTS

| | | |
|---|---|---|
| EP | 1150608 | 12/2004 |
| JP | 2001344604 | 12/2001 |
| JP | 2002042136 | 2/2002 |
| JP | 2004164170 | 6/2004 |
| JP | 2004-355403 | 12/2004 |
| JP | 2004355658 | 12/2004 |
| JP | 2005196470 | 7/2005 |
| JP | 2006012080 | 1/2006 |
| JP | 2010-277315 | 12/2010 |
| JP | 2016035748 | 3/2016 |
| KR | 101537211 | 7/2015 |
| TW | I298852 | 7/2008 |
| TW | I517057 | 1/2016 |
| TW | 201624348 | 7/2016 |
| TW | 201714117 | 4/2017 |
| WO | 2010061900 | 6/2010 |
| WO | 2017003356 | 1/2017 |

OTHER PUBLICATIONS

Jeong-Woo Lee et al., "A 600-dpi Capacitive Fingerprint Sensor Chip and Image-Synthesis Technique", IEEE Journal of Solid-State Circuits, Apr. 1999, pp. 469-475.

"Office Action of Taiwan Counterpart Application," dated Jul. 9, 2019, p. 1-p. 12.

"Office Action of Japan Counterpart Application," dated Aug. 23, 2019, p. 1-p. 4.

"Office Action of Great Britain Counterpart Application," dated Jan. 28, 2019, p. 1-p. 5.

* cited by examiner

FINGERPRINT RECOGNITION METHOD AND ELECTRONIC DEVICE USING THE SAME

CROSS-REFERENCE TO RELATED APPLICATIONS

This application is a continuation-in-part application of and claims the priority benefit of U.S. application Ser. No. 14/624,272, filed on Feb. 17, 2015, now allowed. The prior U.S. application Ser. No. 14/624,272 claims the priority benefits of Taiwan application serial no. 103107800, filed on Mar. 7, 2014, and Taiwan application serial no. 103126149, filed on Jul. 31, 2014. This application also claims the priority benefit of U.S. provisional application Ser. No. 62/571,264, filed on Oct. 12, 2017. The entirety of each of the above-mentioned patent applications is hereby incorporated by reference herein and made a part of this specification.

BACKGROUND OF THE INVENTION

1. Technical Field

The invention generally relates to fingerprint recognition technology, and more particularly, to a fingerprint recognition method and an electronic device using the same.

2. Description of Related Art

In recent years, biometric recognition technology has developed greatly. Since security codes and access cards may be easily stolen or lost, more attention has been paid to fingerprint-recognition technology. Fingerprints are unique and never-changing, and each person has multiple fingers for identity recognition. In addition, fingerprints can be obtained easily using fingerprint sensors. Therefore, fingerprint recognition can provide increased security and convenience, and financial security and confidential data can be better protected.

In one conventional method of fingerprint recognition, the user presses his or her finger on the fingerprint sensor several times in order to generate a plurality of registered fingerprint datasets and then presses his or her finger again on the fingerprint sensor for verification. However, for the fingerprint sensor with a small sensing area, in order to obtain sufficient registered fingerprint datasets for recognition, the user needs to press many times so as to complete the fingerprint registration process.

In another conventional method of fingerprint recognition, the user swipes his or her finger over the fingerprint sensor of an electronic device, and the electronic device will obtain a plurality of frames when the user is swiping the finger over the fingerprint sensor. The electronic device will then construct the frames to generate a registered fingerprint dataset. The user may be asked to swipe the finger over the fingerprint sensors several times. Therefore, a plurality of registered fingerprint datasets will be generated accordingly. For verification, the user has to swipe the finger over the fingerprint sensor again, and the electronic device comprising the fingerprint sensor will generate a verifying fingerprint dataset accordingly. The electronic device will compare the verifying fingerprint dataset with the registered fingerprint dataset(s) and then decide whether the verifying fingerprint dataset passes the verification.

SUMMARY OF THE INVENTION

The invention relates to a fingerprint recognition method and an electronic device using the same, which are capable of obtaining a registration template by asking a user to swipe his or her finger over a fingerprint sensor of the electronic device and comparing a verifying fingerprint information with the registration template for recognition by asking the user to press the finger on the fingerprint sensor.

The fingerprint recognition method is adapted to an electronic device. The electronic device includes a processing unit and a fingerprint sensor. The fingerprint recognition method includes steps of: obtaining a plurality of swiping frames by the fingerprint sensor; extracting a plurality of feature points respectively from the plurality of swiping frames to generate a plurality of pre-registered fingerprint datasets accordingly by the processing unit; merging the plurality of pre-registered fingerprint datasets by the processing unit; generating a registration template according to the merged pre-registered fingerprint datasets by the processing unit; obtaining a pressing frame by the fingerprint sensor; extracting a plurality of feature points from the pressing frame to generate a verifying fingerprint dataset by the processing unit; and comparing the verifying fingerprint dataset with the registration template by the processing unit, so as to determine whether the verifying fingerprint dataset matches the registration template.

The electronic device includes a fingerprint sensor and a processing unit. The fingerprint sensor is configured to obtain a plurality of swiping frames and a pressing frame. The processing unit is coupled to the fingerprint sensor, and configured to receive the plurality of swiping frames and the pressing frame. The processing unit extracts a plurality of feature points respectively from the plurality of swiping frames to generate a plurality of pre-registered fingerprint datasets accordingly. The processing unit merges the plurality of pre-registered fingerprint datasets, and generates a registration template according to the merged pre-registered fingerprint datasets. The processing unit extracts a plurality of feature points from the pressing frame to generate a verifying fingerprint dataset, and compares the verifying fingerprint dataset with the registration template, so as to determine whether the verifying fingerprint dataset matches the registration template.

To make the above features and advantages of the disclosure more comprehensible, several embodiments accompanied with drawings are described in detail as follows.

BRIEF DESCRIPTION OF THE DRAWINGS

The invention will become more fully understood by referring to the following detailed description with reference to the accompanying drawings, wherein.

DESCRIPTION OF THE EMBODIMENTS

The following description is of the best-contemplated mode of carrying out the invention. This description is made for the purpose of illustrating the general principles of the invention and should not be taken in a limiting sense. The scope of the invention is best determined by reference to the appended claims.

Figure 1:
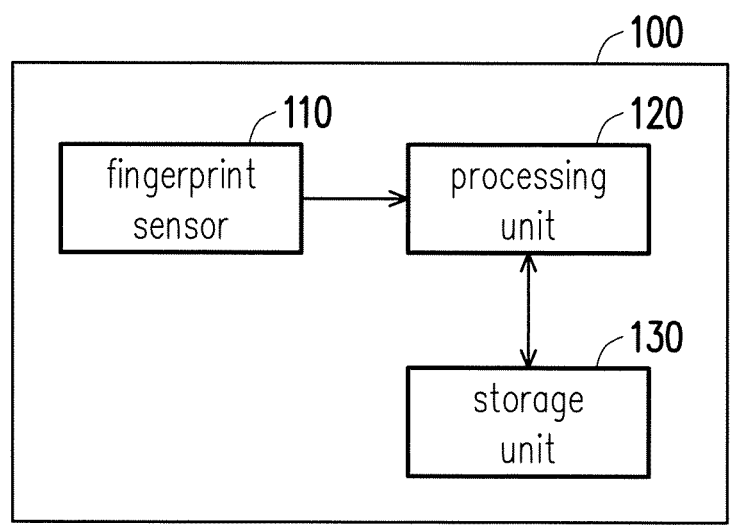
FIG. 1 is an electronic device 100 according to an embodiment of the invention.

FIG. 1 is an electronic device 100 according to an embodiment of the invention. As shown in FIG. 1, the electronic device 100 comprises a fingerprint sensor 110, a processing unit 120 and a storage unit 130. FIG. 1 presents a simplified block diagram in which only the elements relevant to the invention are shown. However, the invention should not be limited to what is shown in FIG. 1.

In an embodiment of the invention, the fingerprint sensor 110 has a small sensing area of n×m. For example, the sensing area of the fingerprint sensor 110 may be 10 mm×4 mm, 6 mm×6 mm or 4 mm×3.2 mm. Namely, the sensing area of the fingerprint sensor 110 is small, and the area of the frames which are sensed by the fingerprint sensor 110 while the user is swiping or pressing his or her finger over or on the fingerprint sensor will be small too since the area of the frame is equal to the sensing area of the fingerprint sensor 110. The frame is small, and therefore, each frame may comprise few minutiae (e.g. fewer than 5 minutiae).

In an embodiment of the invention, when registering a fingerprint, the user may swipe his or her finger over the fingerprint sensor 110 several times (i.e. 2~4 times). After each time of the user's finger swiping over the fingerprint sensor 110, the electronic device 100 will obtain a plurality of swiping frames and the processing unit 120 will select a plurality of effective frames from the swiping frames. Namely, the number of the effective frames is smaller than that of the swiping frames. The effective frames will form a registered fingerprint dataset. In an embodiment of the invention, after the processing device 120 has selected the registered fingerprint dataset, the registered fingerprint dataset will be stored in the storage unit 130. After the user swipes his or her finger over the fingerprint sensor 110 several times (i.e. 2~4 times), a plurality of registered fingerprint datasets will be stored in the storage unit 130.

In an embodiment of the invention, in order to register a fingerprint, the user will be asked to swipe his or her finger over the fingerprint sensor 110 four times along four different directions. For example, the user will be asked to swipe his or her finger four times along four different directions of (1) from upper to lower (or vise-versa), (2) from left to right (or vise-versa), (3) from upper-left to lower-right (or vise-versa) and (4) from upper-right to lower-left (or vise-versa). By asking the user to swipe the finger along the four different directions, four registered fingerprint datasets will be generated and each of the registered fingerprint datasets is corresponding to one of the four different directions.

In order to verify a fingerprint, in an embodiment of the invention, the user will be asked to press his or her finger on the fingerprint sensor 110. One frame of fingerprint data will be sensed by the fingerprint sensor 110. The frame of fingerprint data forms a verifying fingerprint dataset. Since the four registered fingerprint datasets are respectively corresponding to the directions of (1) from upper to lower (or vise-versa), (2) from left to right (or vise-versa), (3) from upper-left to lower-right (or vise-versa) and (4) from upper-right to lower-left (or vise-versa), the rotation between the verifying fingerprint dataset and one of the registered fingerprint dataset will be less than 22.5 degrees. Therefore, during fingerprint recognition, no matter in which direction the user presses his or her finger on the fingerprint sensor 110, the rotation between the verifying fingerprint dataset and one of the registered fingerprint datasets will be less than 22.5 degrees and therefore, is tolerable for fingerprint recognition.

In an embodiment of the invention, after obtaining a plurality of swiping frames sensed by the fingerprint sensor 110 during the user's swiping the finger over the fingerprint sensor 110, the processing unit 120 will select a number of effective frames from the swiping frames to form a registered fingerprint dataset. After the user swipes his or her finger over the fingerprint sensor 110 four times respectively along four different directions, four registered fingerprint datasets corresponding to the four different directions will be generated. The processing unit 120 will generate an array to represent each of the registered fingerprint dataset according to the selected frames included in the registered fingerprint dataset. In one embodiment of the invention, each array is indicated as Si={Fi 1, Fi 2, Fi N}, wherein i indicates the i-th time of the user's swiping the finger over the fingerprint sensor 110. In the case of asking the user to swipe the finger over the fingerprint sensor 110 four times for fingerprint registration, the range of i is $1 \leq i \leq 4$. Fi N indicates an effective frame included in the registered fingerprint dataset. In an embodiment of the invention, when the number of the effective frames for one registered fingerprint dataset is smaller than a default value, the processing unit 120 will determine that the registered fingerprint dataset is ineffective and will discard it.

Figure 2:
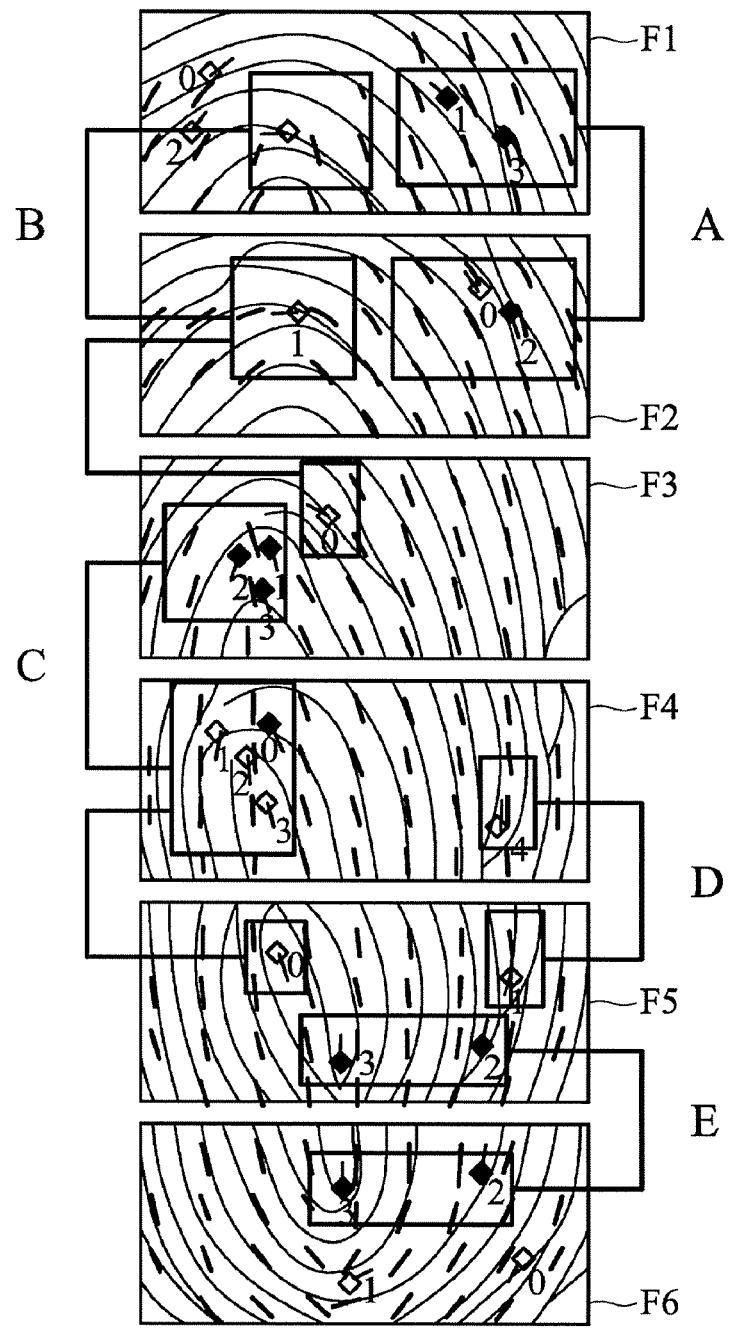
FIG. 2 is a schematic diagram illustrating selection of the effective frames according to an embodiment of the invention.

In an embodiment of the invention, the processing unit 120 selects the effective frames by comparing the minutiae of the swiping frames sensed by the fingerprint sensor 110 during the user's swiping the finger over the fingerprint sensor 110. In the embodiment, the processing unit 120 may identify a number of groups of minutiae in each of the swiping frames, and then compare the swiping frames in sequence by determining whether a specific group of minutiae repeatedly appears in a number of continuous swiping frames. FIG. 2 will illustrate an example of the embodiment.

FIG. 2 is a schematic diagram illustrating the selection of the effective frames according to an embodiment of the invention. For illustration, it is assumed that six swiping frames F1~F6 are sensed and generated after the user swipes his or her finger over the fingerprint sensor 110. As shown in FIG. 2, the processing unit 120 will identify a number of groups of minutiae included in each of frames F1~F6. The identified groups of minutiae are Groups A-E. Group A appears in frames F1 and F2. Group B appears in frames F1, F2 and F3. Group C appears in frames F3, F4 and F5. Group D appears in frames F4 and F5. Group E appears in frames F5 and F6. Then the processing unit 120 will compares the frames F1~F6 in sequence to determine whether a specific group of minutiae repeatedly appears in several continuous frames. As mentioned, Group A appears in frames F1 and F2 while Group B appears in frames F1, F2 and F3. Since the set of frames F1 and F2 is a subset of that of frames F1, F2 and F3, the processing unit 120 will initiate the selection process by analyzing Group B. The processing unit 120 determines that frames F1, F2 and F3 are overlapped while frame F1 and frame F4 are not overlapped since Group B repeatedly appears in frames F1, F2 and F3, but not in frame F4. Namely, frame F1 and F3 are overlapped, and among the overlapped frames comprising Group B, the distance between frame F1 and frame F3 is the farthest. Therefore, the processing unit 120 will select frame F1 and frame F3 as the effective frames to be included into the registered fingerprint dataset. Then, the processing unit 120 will analyze Group C and determine that frames F3, F4 and F5 are overlapped while frame F3 and frame F6 are not overlapped since Group C repeatedly appears in frames F3, F4 and F5, but not in frame F6. Namely, frame F3 and F5 are overlapped, and among the overlapped frames F3, F4 and F5 comprising Group C, the distance between frame F3 and frame F5 is the farthest. Therefore, the processing unit 120 will further select the frame F5 to be an effective frame, and the frame F5 will also be included into the registered fingerprint dataset (F3 has been selected and included). Since the set of frames F4 and F5 is a subset of that of frames F3, F4 and F5, the processing unit 120 will continue the selection process by analyzing Group E without analyzing Group D. The processing unit 120 will analyze Group E and determine that frames F5 and F6 are overlapped while frame F4 and frame F6 are not overlapped since Group E repeatedly appears in frames F5 and F6, but not in frame F4. Therefore, the processing unit 120 will further select the frame F5 to be an effective frame, and the frame F5 will also be included into the registered fingerprint dataset (F5 has been selected and included). Therefore, after analyzing Groups A~E, the processing unit 120 will select frames F1, F3 and F5 as the effective frames to be included into the registered fingerprint dataset to make the registered fingerprint dataset can comprise Groups A~E. Note that the embodiment is only for specifying the invention and it is to be understood that the invention is not limited thereto. The processing unit 120 may select a plurality of frames as the effective frames to be included into the registered fingerprint dataset according to different conditions of minutiae of sensed swiping frames.

Figure 3:
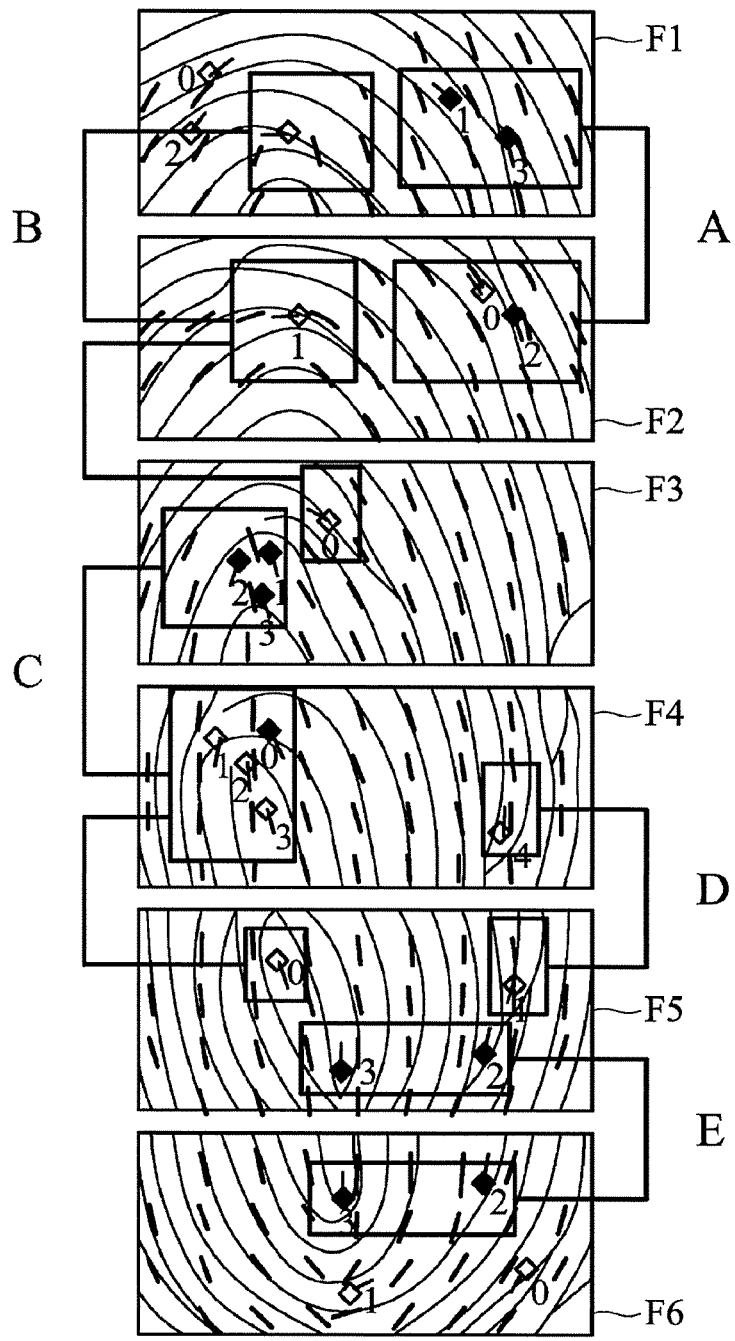
FIG. 3 is a schematic diagram illustrating the selection of the effective frames according to another embodiment of the invention.

In another embodiment of the invention, the processing unit 120 selects effective frames by comparing the reference areas included in the swiping frames which are sensed and obtained during the user's swiping the finger over the fingerprint sensor 110. In the embodiment, the processing unit will identify a plurality of reference areas which are included in the swiping frames. The processing unit 120 will then sequentially compare the swiping frames to determine whether a specific reference area repeatedly appears in a number of continuous swiping frames, and select the effective frames to be included into the registered fingerprint dataset according to the comparison results. FIG. 3 will illustrate an example of the embodiment.

FIG. 3 is a schematic diagram illustrating selection of the effective frames according to another embodiment of the invention. For illustration, it is assumed that six swiping frames F1~F6 are sensed and generated after the user swipes his or her finger over the fingerprint sensor 110. As shown in FIG. 3, the processing unit 120 will identify the reference areas RA~RC which are included in the swiping frames F1~F6. Reference area RA appears in frames F1, F2 and F3, and does not appear in frame F4. Reference area RB appears in frames F3, F4 and F5, and does not appear in frame F6. Reference area RC appears in frames F5 and F6. Then, the processing unit 120 will compare the frames F1~F6 in sequence to determine whether a specific reference area repeatedly appears in several continuous frames, and select the effective frames to be included into the registered fingerprint dataset according to the comparison results. The processing unit 120 will initiate the selection process by analyzing reference area RA, and determine that frames F1, F2 and F3 are overlapped while frame F1 and frame F4 are not overlapped since reference area RA repeatedly appears in frames F1, F2 and F3, but not in frame F4. Namely, frame F1 and F3 are overlapped, and among the overlapped frames F1, F2 and F3 comprising reference area RA, the distance between frame F1 and frame F3 is the farthest. Therefore, the processing unit 120 will select frame F1 and frame F3 as the effective frames to be included into the registered fingerprint dataset. Then, the processing unit 120 will analyze reference area RB, and determine that frames F3, F4 and F5 are overlapped while frame F3 and frame F6 are not overlapped since reference area RB repeatedly appears in frames F3, F4 and F5, but not in frame F6. Namely, frame F3 and F5 are overlapped, and among the overlapped frames F3, F4 and F5 comprising reference area RB, the distance between frame F3 and frame F5 is the farthest. Therefore, the processing unit 120 will further select the frame F5 to be an effective frame, and the frame F5 will also be included into the registered fingerprint dataset (F3 has been selected and included). Then, the processing unit 120 will analyze reference area RC, and determine that frames F5 and F6 are overlapped since reference area RC repeatedly appears in frames F5 and F6. Therefore, the processing unit 120 will further select the frame F5 (F5 has been selected and included) to be an effective frame, and the frame F5 will also be included into the registered fingerprint dataset. Therefore, after analyzing reference areas RA~RC, the processing unit 120 will select frames F1, F3 and F5 as the effective frames to be included into the registered fingerprint dataset to make the registered fingerprint dataset comprise reference areas RA~RC. Note that the embodiment is only for specifying the invention and it is to be understood that the invention is not limited thereto. The processing unit 120 may select a plurality of frames as the effective frames to be included into the registered fingerprint dataset according to different conditions of reference areas of sensed swiping frames.

In another embodiment of the invention, the electronic device 100 further comprises a prompting unit (not shown in figures). When the user swipes his or her finger over the fingerprint sensor 110, the fingerprint sensor 110 will sense along which direction or on which location the user swipes his or her finger over the fingerprint sensor 110 to generate sensed information. The prompting unit generates prompting information according to the sensed information obtained by the fingerprint sensor 110. In an embodiment of the invention, the prompting information is provided to the user for indicating the user whether the user swipes his or her finger over the fingerprint sensor 110 along the correct direction and whether the user needs to move his or her finger to a different location. In an embodiment of the invention, the user swipes his or her finger and stops swiping his or her finger temporarily over the fingerprint sensor 110 several times, and a registered fingerprint dataset will be generated accordingly. After the user has swiped his or her finger over the fingerprint sensor 110 along a default distance, the prompting information will be generated to notify the user to temporarily stop swiping his or her finger without his or her finger leaving the fingerprint sensor 110. A plurality of swiping frames will be sensed during that swiping, and a plurality of effective frames will be selected accordingly. Thereafter, the prompting information will notify the user to swipe his or her finger over the fingerprint sensor 110 again. After a default distance, the prompting information will notify the user to stop swiping his or her finger. Another plurality of effective frames will be selected from the swiping frames sensed during that swiping. In the embodiment, the above mentioned process may be repeated several times, and the selected effective frames from different groups of swiping frames sensed during several times of swiping will be included into the registered fingerprint dataset. In an embodiment of the invention, the prompting information may be configured to inform the user by generating a voice or showing a message on a display unit (not shown in figures).

After all of the registered fingerprint datasets are generated, for verification, the user will be asked to press his or her finger on the fingerprint sensor 110. A pressing fingerprint dataset will be generated accordingly, and transmitted to the processing unit 120. The processing unit 120 will compare the pressing fingerprint dataset with the registered fingerprint datasets. When the pressing fingerprint dataset matches one of the registered fingerprint datasets, the pressing fingerprint dataset will be verified.

Figure 4:
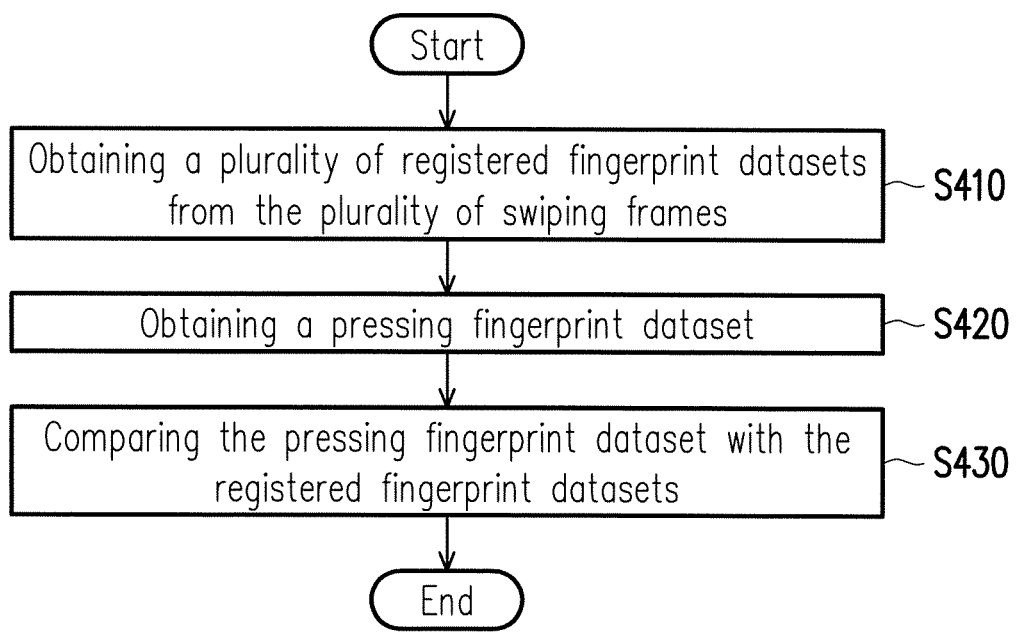
FIG. 4 is a flow chart 400 illustrating the fingerprint recognition method according to an embodiment of the invention.

FIG. 4 is a flow chart 400 illustrating the fingerprint recognition method according to an embodiment of the invention. The fingerprint recognition method is applied to the electronic device 100. As shown in FIG. 4, firstly, in step S410, a plurality of swiping frames are obtained. In step S420, a plurality of registered fingerprint datasets are generated from the plurality of swiping frames. In step S430, a pressing fingerprint dataset is obtained. In step S440, the pressing fingerprint dataset is compared with the registered fingerprint datasets.

Figure 5:
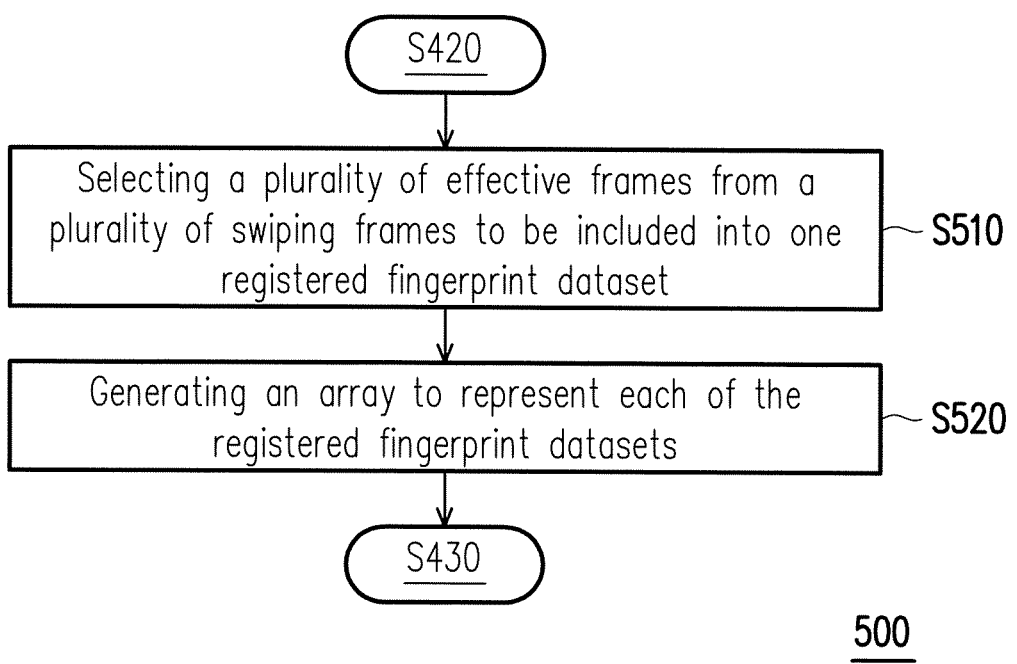
FIG. 5 is a flow chart 500 illustrating step S420 according to an embodiment of the invention.

FIG. 5 is a flow chart 500 illustrating step S420 according to an embodiment of the invention. In an embodiment of the invention, in flow chart 400, each of the registered fingerprint datasets corresponds to a different swiping direction. In the embodiment, step S420 comprises the following steps. In step S510, a plurality of effective frames are selected from a plurality of swiping frames to be included into one registered fingerprint dataset. The plurality of swiping frames are sensed when the user swipes his or her finger over the fingerprint sensor 110 along a particular direction, and that registered fingerprint dataset is corresponding to that particular direction. In step S520, an array is generated to represent each of the registered fingerprint datasets. Each of the arrays comprises the effective frames selected from the plurality of swiping frames sensed when the user swipes his or her finger over the fingerprint sensor 110 along a particular direction, and the array is corresponding to that particular direction. In the embodiment, the effective frames are selected by comparing the minutiae of the swiping frames or by comparing the reference areas of the swiping frames.

Figure 6:
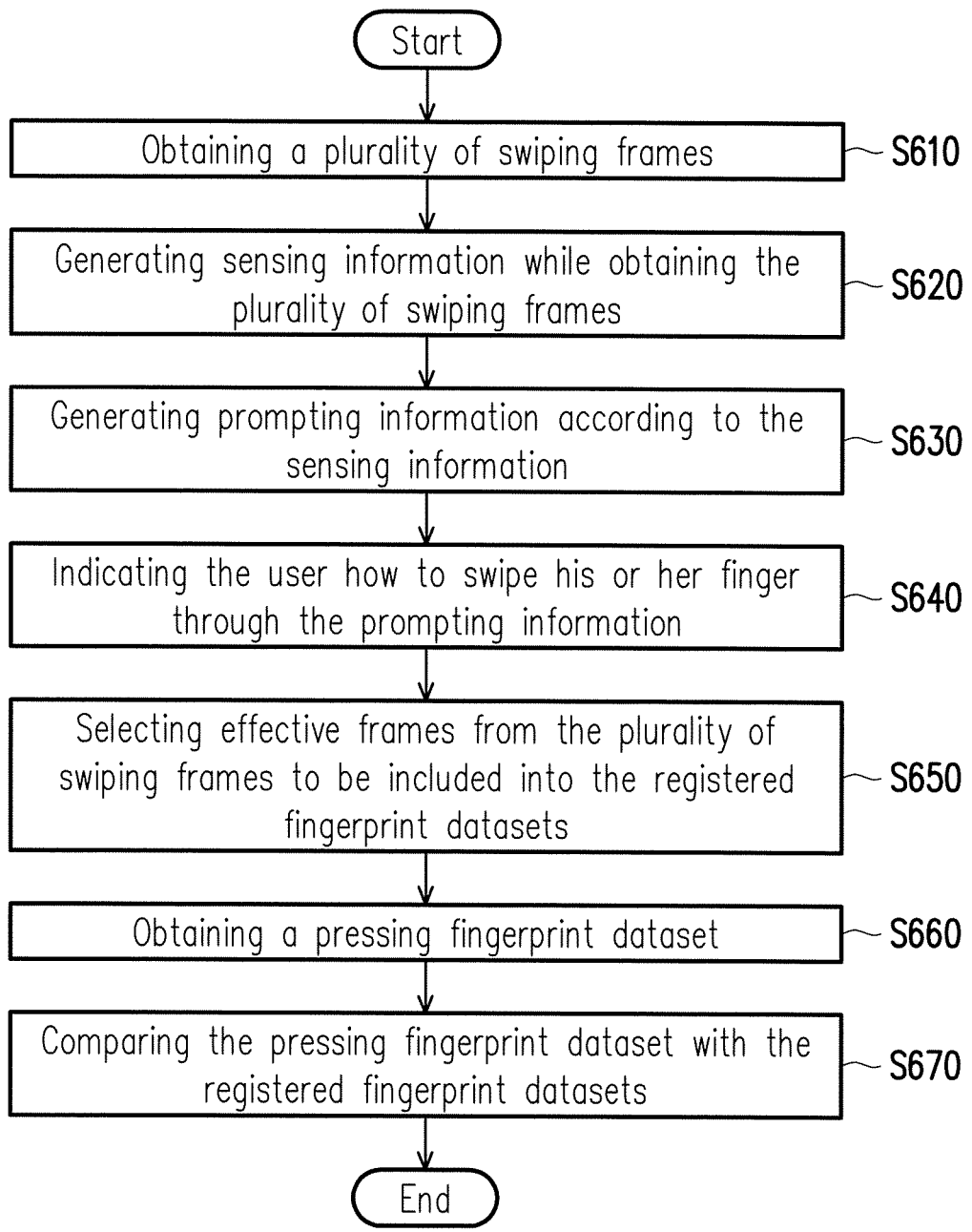
FIG. 6 is a flow chart 600 illustrating the fingerprint recognition method according to another embodiment of the invention.

FIG. 6 is a flow chart 600 illustrating the fingerprint recognition method according to another embodiment of the invention. The fingerprint recognition method is applied to the electronic device 100. As shown in FIG. 6, firstly, in step S610, a plurality of swiping frames are obtained. In step S620, sensing information is generated by the electronic device 100 while the plurality of swiping frames are being obtained. In step S630, prompting information is generated according to the sensing information. In step S640, the prompting information is used to indicate the user along which direction or/and at which location to swipe his or her finger over the fingerprint sensor 110. In step S650, a plurality of effective frames are selected from the plurality of swiping frames to be included into the registered fingerprint datasets. In step S660, one pressing fingerprint dataset is obtained. In step S670, the pressing fingerprint dataset is compared with the registered fingerprint datasets.

Compared with the conventional fingerprint recognition method, in the fingerprint recognition method according to the invention, the user can register his or her fingerprint by swiping his or her finger over the fingerprint sensor, and the user can be recognized and verified by pressing his or her finger on the fingerprint sensor. In addition, in the fingerprint recognition method according to another embodiment, there is no need to reconstruct the frames to generate a composite registered fingerprint dataset. Furthermore, the fingerprint recognition method according to another embodiment may avoid storing too much useless fingerprint information. As a result, the efficiency of fingerprint recognition is promoted.

Figure 7:
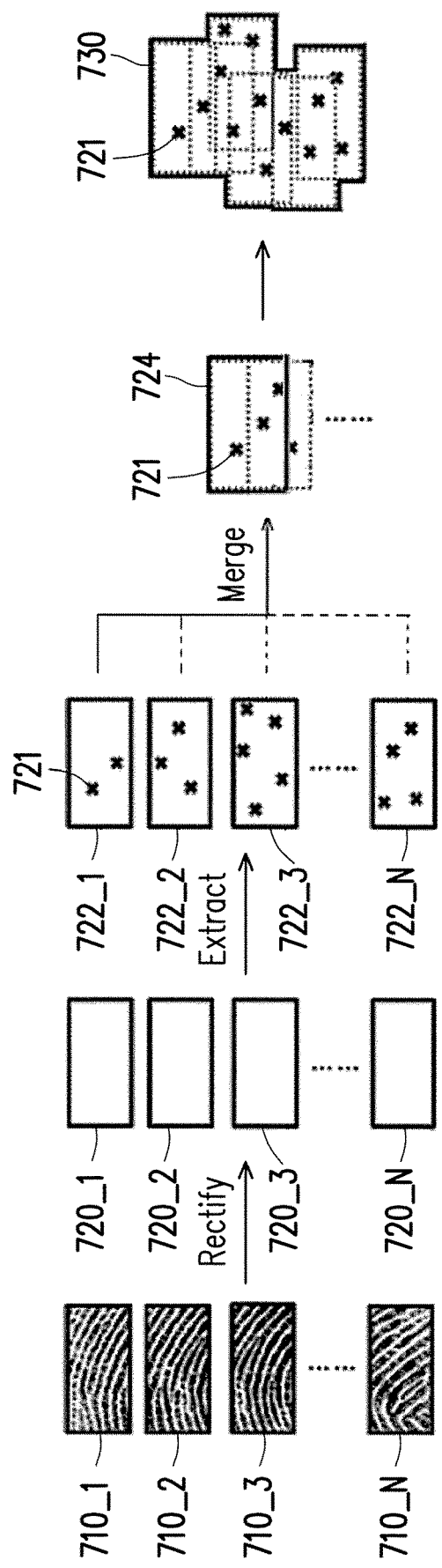
FIG. 7 is a schematic diagram illustrating a fingerprint registration process according to another embodiment of the invention.

FIG. 7 is a schematic diagram illustrating a fingerprint registration process according to another embodiment of the invention. During a registration process, a user is asked to swipe his or her finger over the fingerprint sensor 110. With reference to FIG. 1 and FIG. 7, in the present embodiment, when the user is swiping the finger over the fingerprint sensor 110, the fingerprint sensor 110 senses and obtains a plurality of swiping frames 710_1, 710_2, 710_3 to 710_N. N is a positive integer and greater than 1. The processing unit 120 then executes a distortion rectification operation on the swiping frames 710_1, 710_2, 710_3 to 710_N so as to generate a plurality of rectified frames 720_1, 720_2, 720_3 to 720_N. Specifically, through the distortion rectification operation, the distortion of images, caused by swiping, can be decreased.

The processing unit 120 then extracts a plurality of feature points (i.e. minutiae) 721 from the rectified frames 720_1, 720_2, 720_3 to 720_N so as to generate a plurality of pre-registered fingerprint datasets 722_1, 722_2, 722_3 to 722_N. In the present embodiment, the processing unit 120 may combine and merge the pre-registered fingerprint datasets 722_1, 722_2, 722_3 to 722_N so as to generate and store a registration template 730 in the storage unit 130 when the processing unit 120 determines that the number of the feature points included in or the amount, area or height of the merged pre-registered fingerprint datasets is greater than a predetermined registration threshold. The pre-registered fingerprint datasets 722_1, 722_2, 722_3 to 722_N are combined and merged according to the repeatedness of the feature points 721 and overlapping among the pre-registered fingerprint datasets 722_1, 722_2, 722_3 to 722_N.

Specifically, when the user is swiping the finger over the fingerprint sensor 110, the plurality of swiping frames 710_1, 710_2, 710_3 to 710_N will be obtained in sequence. That is, the processing unit 120 will receive the swiping frames one by one. After the processing unit 120 receives a first swiping frame 710_1, the processing unit 120 will executes a distortion rectification operation on the first swiping frame 710_1 so as to generate a first rectified frame 720_1. Then, the processing unit 120 will extract a plurality of feature points 721 from the first rectified frame 720_1 so as to generate a first pre-registered fingerprint dataset 722_1.

Thereafter, the processing unit 120 will receive a second swiping frame 710_2, execute a distortion rectification operation on the second swiping frame 710_2 so as to generate a second rectified frame 720_2, and extract a plurality of feature points 721 from the second rectified frame 720_2 so as to generate a second pre-registered fingerprint dataset 722_2. Then, the processing unit 120 will combine and merge the first and second pre-registered fingerprint datasets 722_1 and 722_2 to generate a pre-enroll dataset 724. The processing unit 120 will continue to in sequence, receive the following swiping frames, generate rectified frames and pre-registered fingerprint datasets accordingly, and then combine and merge the following pre-registered fingerprint datasets into the pre-enroll dataset 724 until the number of the feature points included in or the amount, area or height of the merged pre-registered fingerprint datasets (i.e. the pre-enroll dataset 724) is greater than the predetermined registration threshold. When the number of the feature points included in or the amount, area or height of the merged pre-registered fingerprint datasets (i.e. the pre-enroll dataset 724) is greater than the predetermined registration threshold, it means the registration process is completed since sufficient fingerprint information has been obtained for fingerprint recognition. Therefore, processing unit 120 will store the merged pre-registered fingerprint datasets (i.e. the pre-enroll dataset 724) as a registration template 730 in the storage unit 130.

Figure 8:
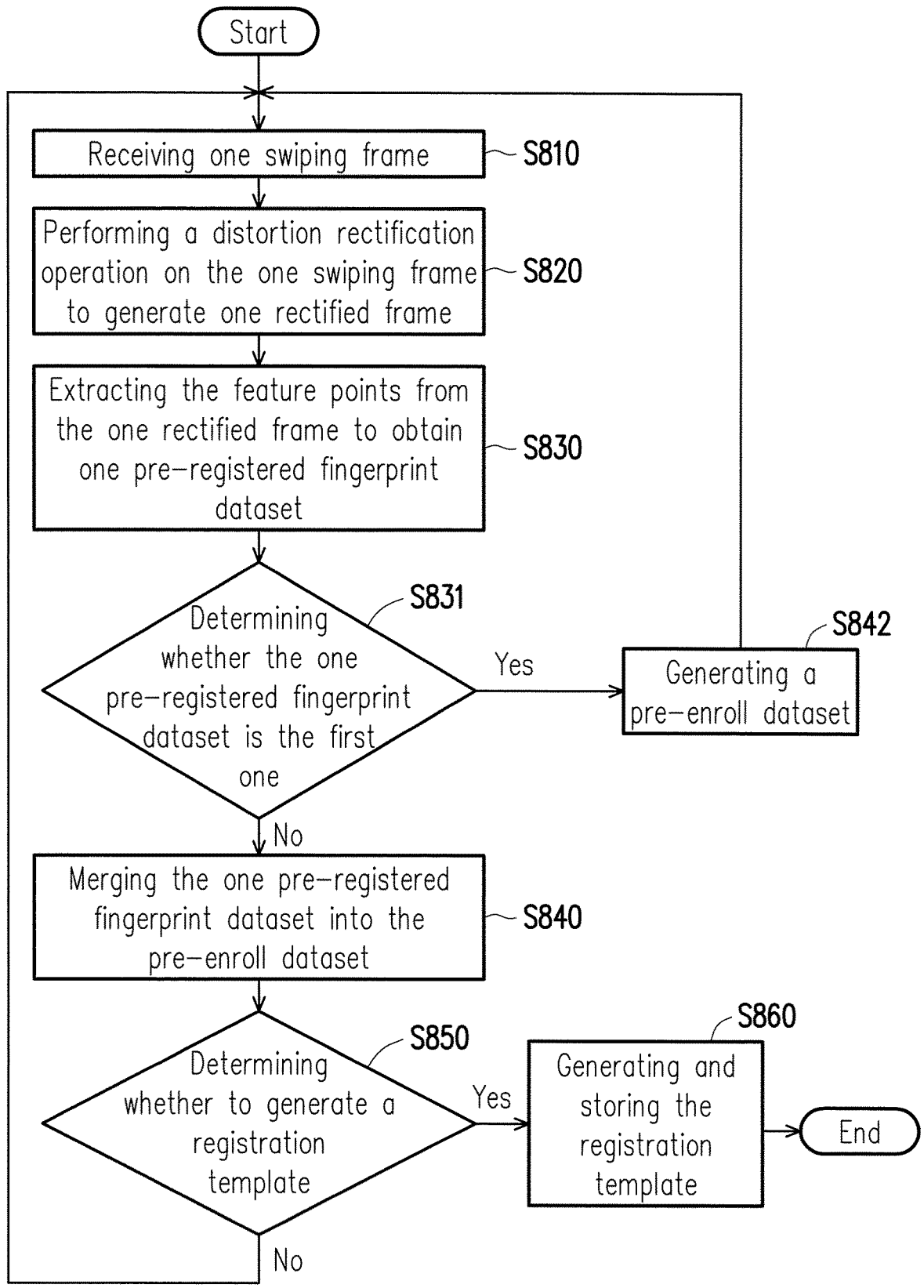
FIG. 8 is a flow chart 800 illustrating a fingerprint registration method according to an embodiment of the invention.

FIG. 8 is a flow chart 800 illustrating a fingerprint registration method according to an embodiment of the invention. When the user is swiping the finger over the fingerprint sensor 110, the fingerprint sensor 110 will sense and obtain a plurality of swiping frames 710_1, 710_2, 710_3 to 710_N in sequence. In step S810, the processing unit 120 receives one swiping frame (i.e. one of the swiping frames 710_1, 710_2, 710_3 to 710_N). In step S820, the processing unit 120 performs one distortion rectification operation on the one swiping frame to generate a rectified frame (i.e. one of the rectified frames 720_1, 720_2, 720_3 to 720_N). The details of the distortion rectification operation will be discussed later. In step S830, the processing unit 120 extracts the feature points 721 from the one rectified frame to obtain one pre-registered fingerprint dataset (i.e. one of the pre-registered fingerprint datasets 722_1, 722_2, 722_3 to 722_N). In step S831, the processing unit 120 determines whether the one generated pre-registered fingerprint dataset is the first one. If no, step S840 will be performed. If yes, step S842 will be performed. In step S842, the processing unit 120 generates a pre-enroll dataset 724 according to the first pre-registered fingerprint dataset 722_1. Then, the processing unit 120 performs step S810 to receive the second swiping frame 710_2.

In step S840, the processing unit 120 merges the one pre-registered fingerprint dataset into the pre-enroll dataset 724 according to the repeatedness of the feature points 721 and overlapping among the one pre-registered fingerprint dataset and the pre-enroll dataset 724. In step S850, the processing unit 120 determines whether to generate a registration template 730 according to the number of the feature points 721 included in or the amount, area or height of the merged pre-registered fingerprint datasets (i.e. the pre-enroll dataset 724). Specifically, if the processing unit 120 determines that the number of the feature points included in or the amount, area or height of the merged pre-registered fingerprint datasets (i.e. the pre-enroll dataset 724) is greater than a predetermined registration threshold, the processing unit 120 will execute step S860. In S860, the processing unit 120 generates and stores the registration template 730 according to the merged pre-registered fingerprint datasets (i.e. the pre-enroll dataset 724). In other words, the pre-enroll dataset 724 is stored as the registration template 730. The registration process will end since sufficient fingerprint information has been obtained for fingerprint recognition.

If the processing unit 120 determines that the number of the feature points included in or the amount, area or height of the merged pre-registered fingerprint datasets 722 is not greater than the predetermined registration threshold, the processing unit 120 will perform step S810 to receive the next swiping frame. The user may be asked to swipe the finger over the fingerprint sensor 110 again if the registration process is not completed after the first swipe of finger by the user.

Figure 9:
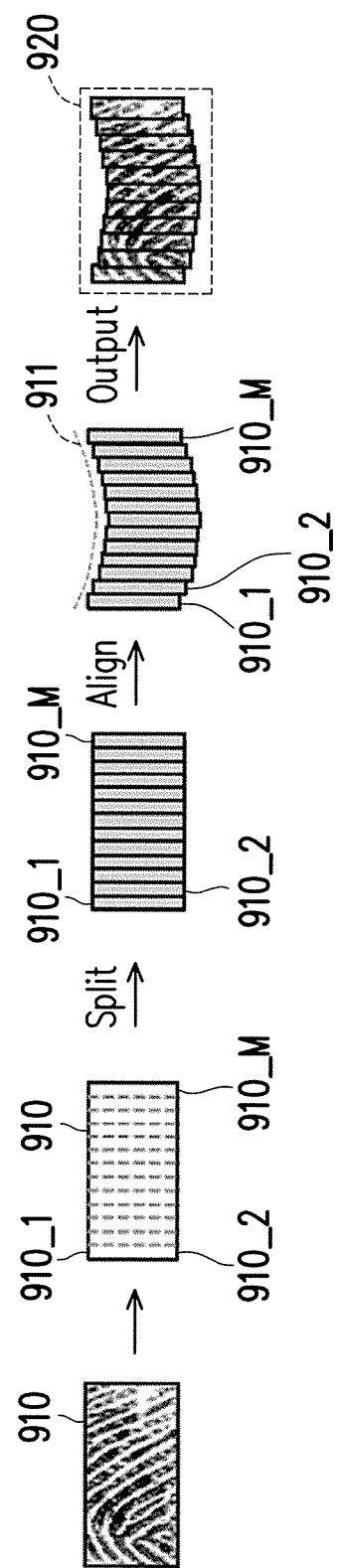
FIG. 9 is a schematic diagram illustrating a distortion rectification operation according to an embodiment of the invention.

FIG. 9 is a schematic diagram illustrating a distortion rectification operation according to an embodiment of the invention. With reference to FIG. 1 and FIG. 9, in the present embodiment, during the registration process, the user is asked to swipe the finger over the fingerprint sensor 110, and the fingerprint sensor 110 will sense and obtain a plurality of swiping frames in sequence. The processing unit 120 will then perform the distortion rectification operation on each of the swiping frames in sequence. Take one swiping frame 910 for example. Firstly, the processing unit 120 vertically splits the swiping frame 910 into a plurality of vertical parts 910_1, 910_2 to 910_M. M is a positive integer and greater than 1. Then, the processing unit 120 computes the vertical parts 910_1, 910_2 to 910_M with a Gaussian function, i.e. Gaussianizes the vertical parts 910_1, 910_2 to 910_M. The Gaussian function can be represented by a distribution curve (i.e. a Gaussian curve) 911, which will be discussed in details later. After the Gaussianization, each of the vertical parts 910_1, 910_2 to 910_M is aligned with its neighboring vertical parts according to the Gaussian curve 911. Finally, the processing unit 120 generates a rectified frame 920 accordingly.

Figure 10:
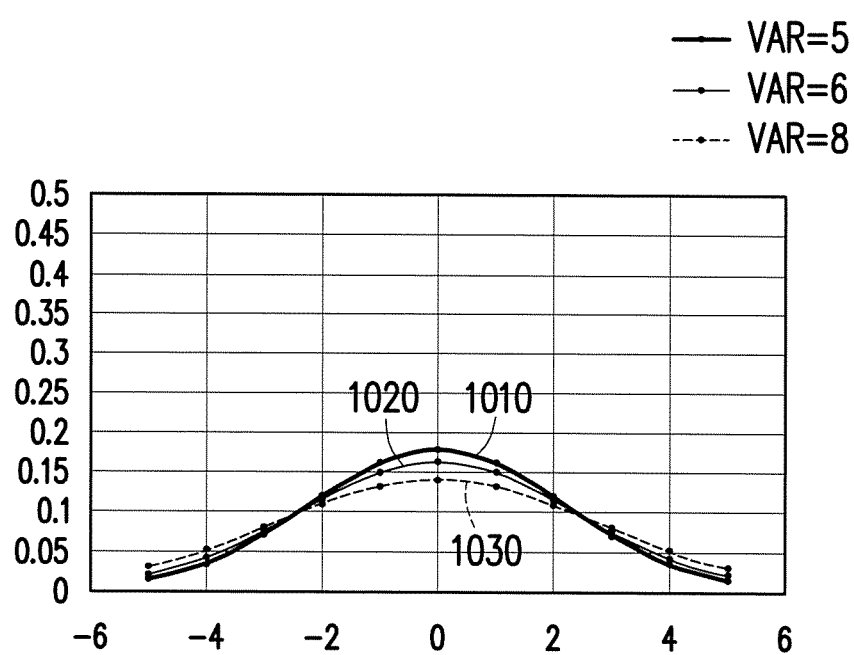
FIG. 10 is a schematic diagram illustrating Gaussian curves 1010, 1020 and 1030 according to the embodiments of the invention.

In addition, in the present embodiment, the Gaussian curve 911 can be pre-determined according to experiences, experiments and/or statistics on the field of fingerprint recognition. For example, please refer to FIG. 10. FIG. 10 is a schematic diagram illustrating Gaussian curves 1010, 1020 and 1030 according to the embodiments of the invention. In an embodiment of the invention, the above mentioned distribution curve 911 may be one of the Gaussian curves 1010, 1020 and 1030 as shown in FIG. 10. The variance (VAR) of the Gaussian curves 1010, 1020 and 1030 is respectively 5, 6 and 8, but the invention is not limited thereto. In a preferred embodiment, the variance (VAR) is in the range of 5 to 8.

Figure 11:
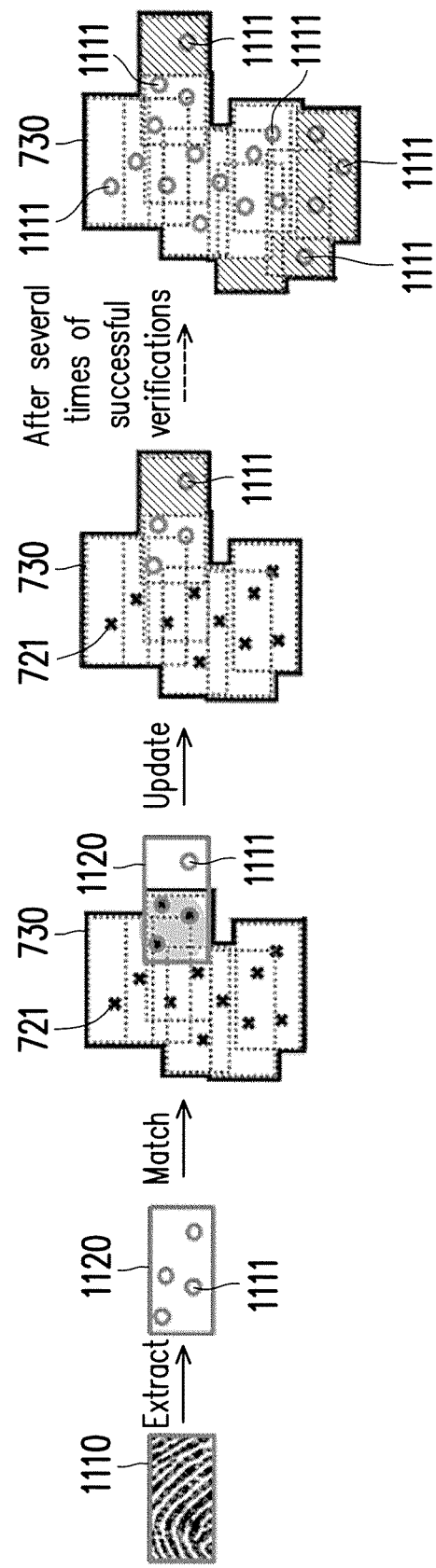
FIG. 11 is a schematic diagram illustrating a fingerprint verification process according to an embodiment of the invention.

FIG. 11 is a schematic diagram illustrating a fingerprint verification process according to an embodiment of the invention. During a verification process, a user is asked to press his or her finger over the fingerprint sensor 110. With reference to FIG. 1 and FIG. 11, in the present embodiment, when the user presses the finger over the fingerprint sensor 110, the fingerprint sensor 110 senses and obtains a pressing frame 1110. The processing unit 120 extracts a plurality of feature points (i.e. minutiae) 1111 from the pressing frame 1110 so as to generate a verifying fingerprint dataset 1120. In the present embodiment, the processing unit 120 compares the verifying fingerprint dataset 1120 with the registration template 730 to determine whether the verifying fingerprint dataset 1120 matches the registration template 730. When the verifying fingerprint dataset 1120 matches the registration template 730, the processing unit 120 determines that the verifying fingerprint dataset 1120 passes the verification. Specifically, the verified verifying fingerprint dataset 1120 will match one portion of the registration template 730 since the registration template 730 is formed by merging a plurality of fingerprint datasets and has a greater area than the verified verifying fingerprint dataset 1120.

Furthermore, the processing unit 120 will determine whether such portion of the registration template 730 which the verified verifying fingerprint dataset 1120 matches is generated from a swiping frame or a pressing frame. If such portion of the registration template 730 is generated from a swiping frame, it means that such portion is originally included in the registration template 730 after the registration process. Then, the processing unit 120 will use the verified verifying fingerprint dataset 1120 to update the registration template 730. That is, such portion of the registration template 730 will be replaced and updated with the verified verifying fingerprint dataset 1120. After the update, as shown in FIG. 11, the area of the registration template 730 may be expanded (the striped part in the template 730) since the area of the verified verifying fingerprint dataset 1120 might be greater than the area of the matched portion of the registration template 730. On the other hand, if such portion of the registration template 730 is generated from a pressing frame, it means that such portion is merged into the registration template 730 after a previous successful verification. Then, the processing unit 120 will not use the verified verifying fingerprint dataset 1120 to update the registration template 730. As show in FIG. 11, after several times of successful verifications, the area of the registration template 730 is expanded (i.e. the striped part in the registration template 730).

Figure 12:
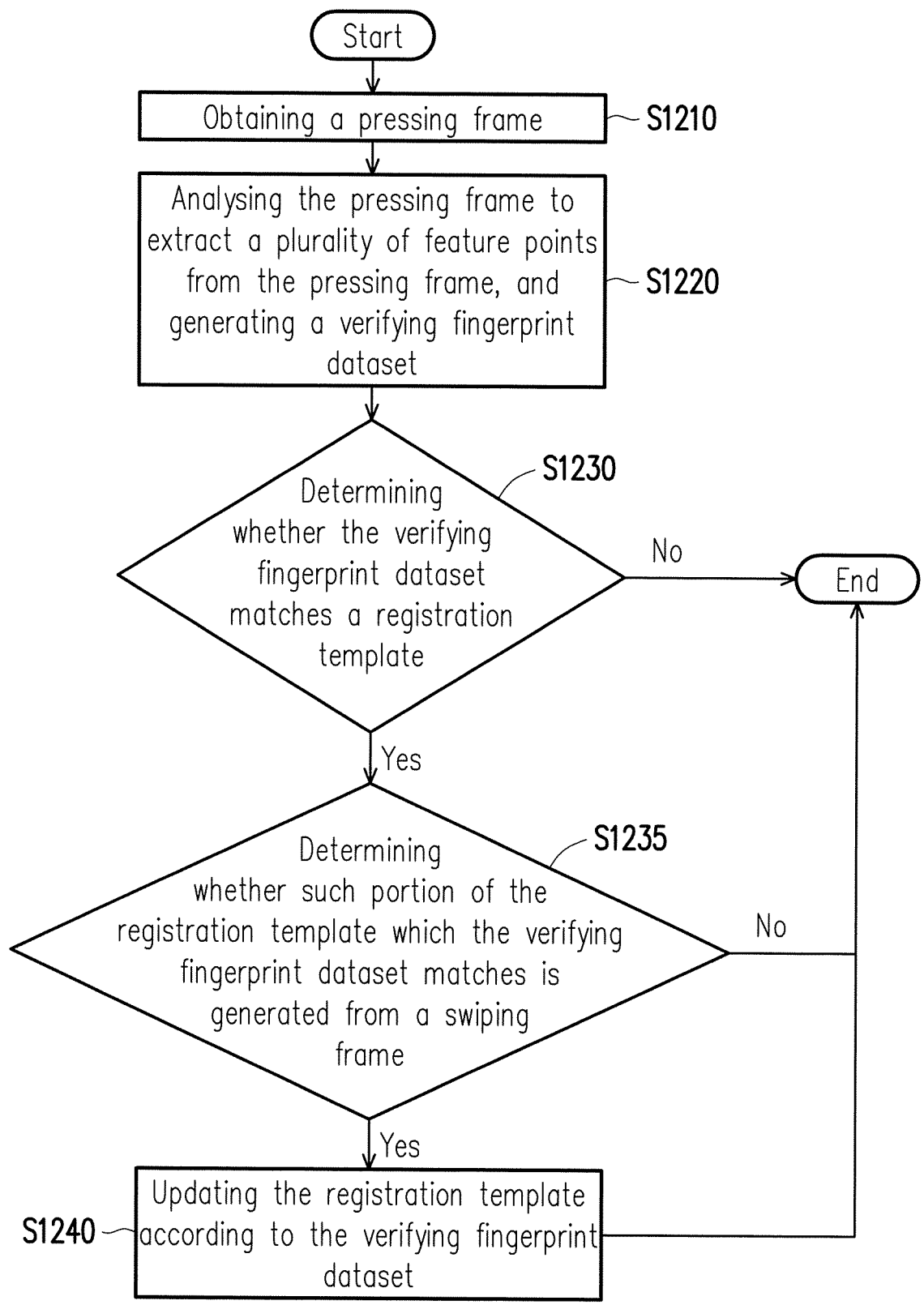
FIG. 12 is a flow chart 1200 illustrating a fingerprint verification method according to an embodiment of the invention.

FIG. 12 is a flow chart 1200 illustrating a fingerprint verification method according to an embodiment of the invention. For fingerprint verification, the user is asked to press the finger on the fingerprint sensor 110. With reference to FIG. 1, FIG. 11 and FIG. 12, in step S1210, the fingerprint sensor 110 senses and obtains a pressing frame 1110 when the user puts the finger on the fingerprint sensor 110. In step S1220, the processing unit 120 analyses the pressing frame 1110 to extract a plurality of feature points 1111 from the pressing frame 1110 and generates a verifying fingerprint dataset 1120 (i.e. a pressing fingerprint dataset) accordingly.

In step S1230, the processing unit 120 determines whether the verifying fingerprint dataset 1120 matches the registration template 730. In the present embodiment, the registration template 730 is stored in storage unit 130. More specifically, the processing unit 120 may compare the feature points included in the verifying fingerprint dataset 1120 to the feature points included in the registration template 730 to obtain a similarity. The verifying fingerprint dataset 1120 matches the registration template 730 when the similarity between the verifying fingerprint dataset 1120 and one portion of the registration template 730 is greater than a predetermined similarity threshold. When the verifying fingerprint dataset 1120 matches the registration template 730, the processing unit 120 determines that the verifying fingerprint dataset 1120 passes verification and the user is an authorized user. As mentioned above, the verified verifying fingerprint dataset 1120 will match one portion of the registration template 730 since the registration template 730 is formed by merging a plurality of fingerprint datasets and has a greater area than the verified verifying fingerprint dataset 1120.

In step S1235, the processing unit 120 determines whether such portion of the registration template 730 which the verified verifying fingerprint dataset 1120 matches is generated from a swiping frame or a pressing frame. If such portion of the registration template 730 is generated from a swiping frame, it means that such portion is originally included in the registration template 730 after the registration process. Then, step S1240 will be performed. In step S1240, the processing unit 120 updates the registration template 730 with the verified verifying fingerprint dataset 1120. That is, such portion of the registration template 730 will be replaced and updated with the verified verifying fingerprint dataset 1120. As mentioned above, after the update, the area of the registration template 730 may be expanded since the area of the verified verifying fingerprint dataset 1120 might be greater than the area of the matched portion of the registration template 730.

On the other hand, if such portion of the registration template 730 is generated from a pressing frame, it means that such portion is merged into the registration template 730 after a previous successful verification. Then, the processing unit 120 will not use the verified verifying fingerprint dataset 1120 to update the registration template 730.

Compared with the conventional fingerprint recognition method, in the fingerprint recognition method according to the invention, the user can register his or her fingerprint by swiping his or her finger over the fingerprint sensor and be recognized and verified by pressing the finger on the fingerprint sensor. By one single swipe of finger by the user, a plurality of swiping frames can be sensed. The user may be asked to swipe the finger more than once, but not many times. In preferred embodiments, sufficient fingerprint information may be obtained and the registration process is completed after one to three swipes of finger by user. This improves the efficiency of the registration process. In addition, during the registration process, the swiping frames are rectified with a Gaussian curve, reducing the distortion of images caused by swiping.

Furthermore, the registration template will be updated with the verified pressing datasets after several times of successful verifications. The distortion of images caused by swiping will be completely removed after the registration template is completely updated with the verified pressing datasets. Therefore, the accuracy of fingerprint recognition will be improved. In summary, this invention is designed to provide the user with experiences of efficient registration by asking the user to swipe the finger and easy verification by asking the user to press the finger. At the same time, the efficiency and accuracy of fingerprint recognition are also upgraded.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects, a computer program product may comprise packaging materials.

Reference throughout this specification to "one embodiment" or "an embodiment" means that a particular feature, structure, or characteristic described in connection with the embodiment is included in at least one embodiment of the invention, but do not denote that they are present in every embodiment. Thus, the appearances of the phrases "in one embodiment" or "in an embodiment" in various places throughout this specification are not necessarily referring to the same embodiment of the invention.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A fingerprint recognition method, applied in an electronic device, the electronic device comprising a processing unit and a fingerprint sensor, comprising:
   obtaining a plurality of swiping frames by the fingerprint sensor;
   extracting a plurality of feature points respectively from the plurality of swiping frames to generate a plurality of pre-registered fingerprint datasets accordingly by the processing unit;
   merging the plurality of pre-registered fingerprint datasets by the processing unit;
   generating a registration template according to the merged pre-registered fingerprint datasets by the processing unit;
   obtaining a pressing frame by the fingerprint sensor;
   extracting a plurality of feature points from the pressing frame to generate a verifying fingerprint dataset by the processing unit;
   comparing the verifying fingerprint dataset with the registration template by the processing unit, so as to determine whether the verifying fingerprint dataset matches the registration template; and
   rectifying the plurality of swiping frames to generate a plurality of rectified frames according to a distribution curve by the processing unit, wherein the step of rectifying the plurality of swiping frames to generate the plurality of rectified frames according to the distribution curve by the processing unit comprises:
      vertically splitting each of the plurality of swiping frames into a plurality of vertical parts; and
      aligning each of the plurality of vertical parts with its neighboring vertical parts according to the distribution curve.

2. The fingerprint recognition method as claimed in claim 1, wherein the distribution curve is a Gaussian curve, and a variance of the Gaussian curve is in the range of 5 to 8.

3. The fingerprint recognition method as claimed in claim 1, wherein the step of merging the plurality of pre-registered fingerprint datasets by the processing unit comprises:
   merging the plurality of pre-registered fingerprint datasets according to the repeatedness of the plurality of feature points and overlapping among the plurality of pre-registered fingerprint datasets.

4. The fingerprint recognition method as claimed in claim 1, wherein before the step of generating the registration template by the processing unit, the method further comprises the step of:
   determining whether the number of the feature points included in or the amount, area or height of the merged pre-registered fingerprint datasets is greater than a predetermined registration threshold.

5. The fingerprint recognition method as claimed in claim 1, wherein the step of comparing the verifying fingerprint dataset with the registration template to determine whether the verifying fingerprint dataset matches the registration template comprises:
   comparing the feature points of the verifying fingerprint dataset with the feature points of the registration template to obtain a similarity; and
   if the similarity is higher than a predetermined similarity threshold, determining the verifying fingerprint dataset matches the registration template.

6. The fingerprint recognition method as claimed in claim 1, further comprising:
   when the verifying fingerprint dataset matches the registration template, further determining whether one portion of the registration template the verifying fingerprint dataset matches is generated from one of the plurality of swiping frames by the processing unit; and
   if the one portion of the registration template the verifying fingerprint dataset matches is generated from one of the plurality of swiping frames, updating the registration template with the verifying fingerprint dataset by the processing unit.

7. The fingerprint recognition method as claimed in claim 6, wherein the step of updating the registration template by the processing unit comprises:
   updating the one portion of the registration template with the verifying fingerprint dataset by the processing unit; wherein if an area of the verifying fingerprint dataset is greater than an area of the one portion of the registration template, a total area of the registration template will be expanded after the update.

8. An electronic device, comprising:
   a fingerprint sensor, configured to obtain a plurality of swiping frames and a pressing frame; and
   a processing unit, coupled to the fingerprint sensor, configured to receive the plurality of swiping frames and the pressing frame,
   to extract a plurality of feature points respectively from the plurality of swiping frames to generate a plurality of pre-registered fingerprint datasets accordingly, to merge the plurality of pre-registered fingerprint datasets, to generate a registration template according to the merged pre-registered fingerprint datasets,
   to extract a plurality of feature points from the pressing frame to generate a verifying fingerprint dataset, and to compare the verifying fingerprint dataset with the registration template, so as to determine whether the verifying fingerprint dataset matches the registration template,
   to rectify the plurality of swiping frames to generate a plurality of rectified frames according to a distribution curve,
   wherein the processing unit vertically splits each of the plurality of swiping frames into a plurality of vertical parts, and the processing unit aligns each of the plurality of vertical parts with its neighboring vertical parts according to the distribution curve, so as to obtain the plurality of rectified frames.

9. The electronic device as claimed in claim 8, wherein the distribution curve is a Gaussian curve, and a variance of the Gaussian curve is in the range of 5 to 8.

10. The electronic device as claimed in claim 8, wherein the processing unit merges the plurality of pre-registered fingerprint datasets according to the repeatedness of the plurality of feature points and overlapping among the plurality of pre-registered fingerprint datasets.

11. The electronic device as claimed in claim 8, wherein before the processing unit generates the registration template, the processing unit determines whether the number of the feature points included in or the amount, area or height of the merged pre-registered fingerprint datasets is greater than a predetermined registration threshold.

12. The electronic device as claimed in claim 8, wherein the processing unit compares the feature points of the verifying fingerprint dataset with the feature points of the registration template to obtain a similarity, and if the similarity is higher than a predetermined similarity threshold, the processing unit determines that the verifying fingerprint dataset matches the registration template.

13. The electronic device as claimed in claim 8, wherein when the verifying fingerprint dataset matches the registration template, the processing unit further determines whether one portion of the registration template the verifying fingerprint dataset matches is generated from one of the plurality of swiping frames, and if the one portion of the registration template the verifying fingerprint dataset matches is generated from one of the plurality of swiping frames, the processing unit updates the registration template with the verifying fingerprint dataset.

14. The electronic device as claimed in claim 13, wherein the processing unit updates the one portion of the registration template with the verifying fingerprint dataset, and if an area of the verifying fingerprint dataset is greater than an area of the one portion of the registration template, a total area of the registration template will be expanded after the update.

15. A fingerprint recognition method, applied in an electronic device, the electronic device comprising a processing unit and a fingerprint sensor, comprising:
   obtaining a plurality of swiping frames by the fingerprint sensor;
   analyzing the plurality of swiping frames by the processing unit to extract a plurality of feature points respectively from the plurality of swiping frames so as to generate a plurality of pre-registered fingerprint datasets accordingly by the processing unit;
   obtaining a pressing frame by the fingerprint sensor;
   extracting a plurality of feature points from the pressing frame to generate a verifying fingerprint dataset by the processing unit;
   comparing the verifying fingerprint dataset with the plurality of pre-registered fingerprint datasets by the processing unit so as to determine whether the verifying fingerprint dataset matches any one of the plurality of pre-registered fingerprint datasets; and
   rectifying the plurality of swiping frames to generate a plurality of rectified frames according to a distribution curve by the processing unit, wherein the step of rectifying the plurality of swiping frames to generate the plurality of rectified frames according to the distribution curve by the processing unit comprises:
      vertically splitting each of the plurality of swiping frames into a plurality of vertical parts; and
      aligning each of the plurality of vertical parts with its neighboring vertical parts according to the distribution curve.

16. An electronic device, comprising:
   a fingerprint sensor, configured to obtain a plurality of swiping frames and a pressing frame; and
   a processing unit, coupled to the fingerprint sensor, configured to analyze the plurality of swiping frames to extract a plurality of feature points respectively from the plurality of swiping frames to generate a plurality of pre-registered fingerprint datasets accordingly, to analyze the pressing frame to extract a plurality of feature points from the pressing frame to generate a verifying fingerprint dataset, and to compare the verifying fingerprint dataset with the plurality of pre-registered fingerprint datasets so as to determine whether the verifying fingerprint dataset matches any one of the plurality of pre-registered fingerprint datasets, to rectify the plurality of swiping frames to generate a plurality of rectified frames according to a distribution curve,
   wherein the processing unit vertically splits each of the plurality of swiping frames into a plurality of vertical parts, and the processing unit aligns each of the plurality of vertical parts with its neighboring vertical parts according to the distribution curve, so as to obtain the plurality of rectified frames.

* * * * *